April 2, 1957
C. JENKINS ET AL
2,787,342
TRAILER MOUNTED DRILLING RIGS
Filed Jan. 7, 1954
3 Sheets-Sheet 3
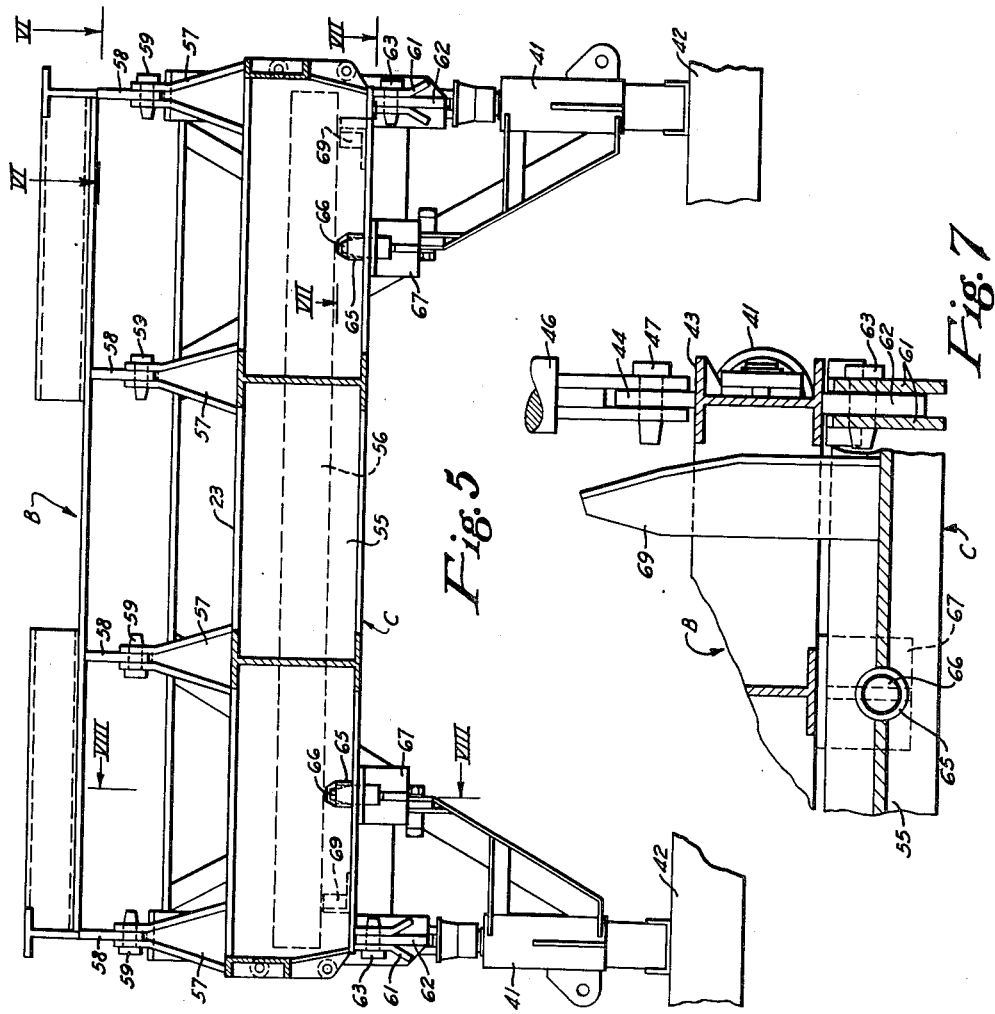
INVENTORS
CECIL JENKINS &
CALVIN L. TURNER
BY
Brown, Critchlow, Flick & Peckham
THEIR ATTORNEYS United States Patent Office 2,787,342
Patented Apr. 2, 1957

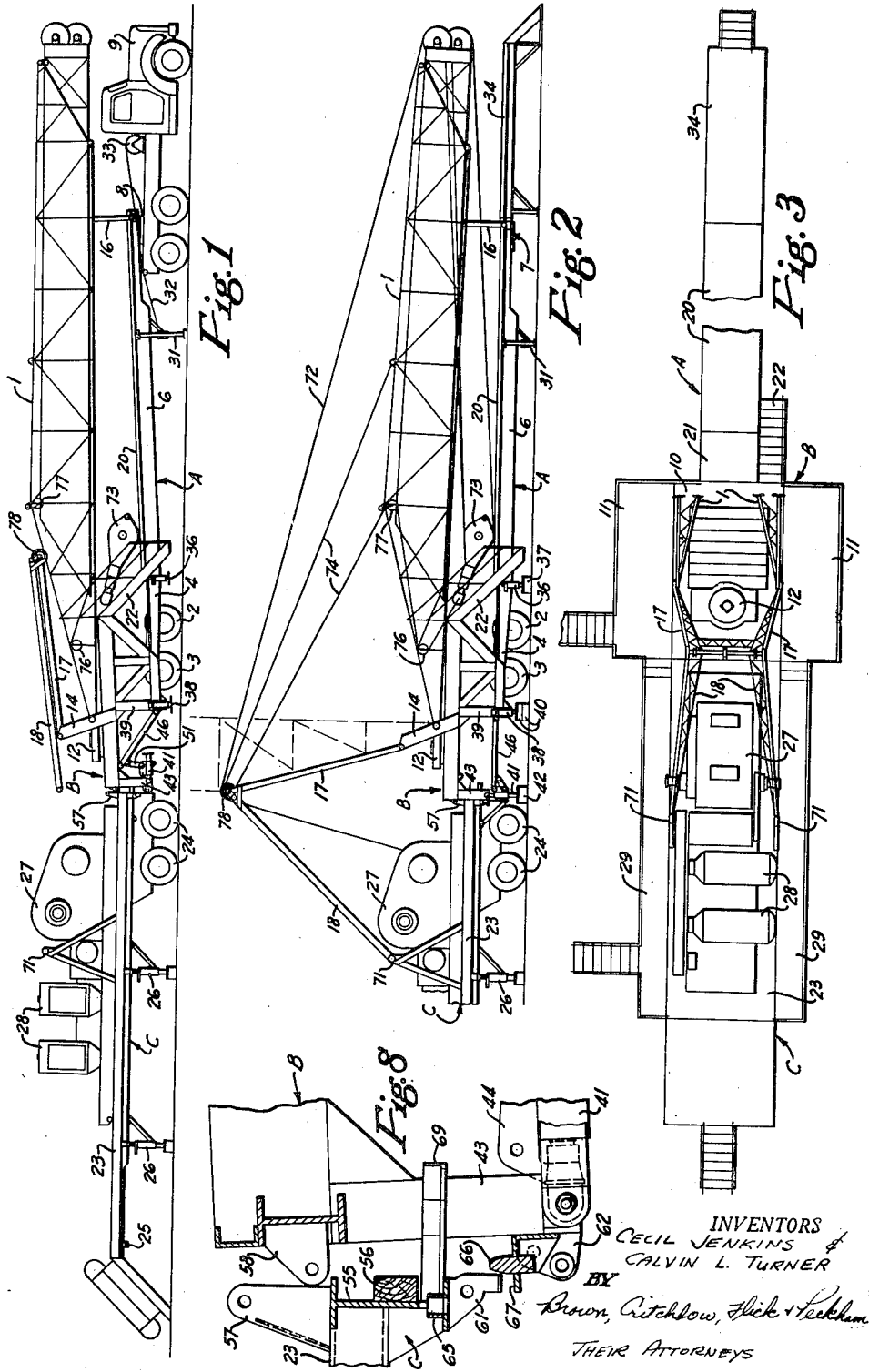

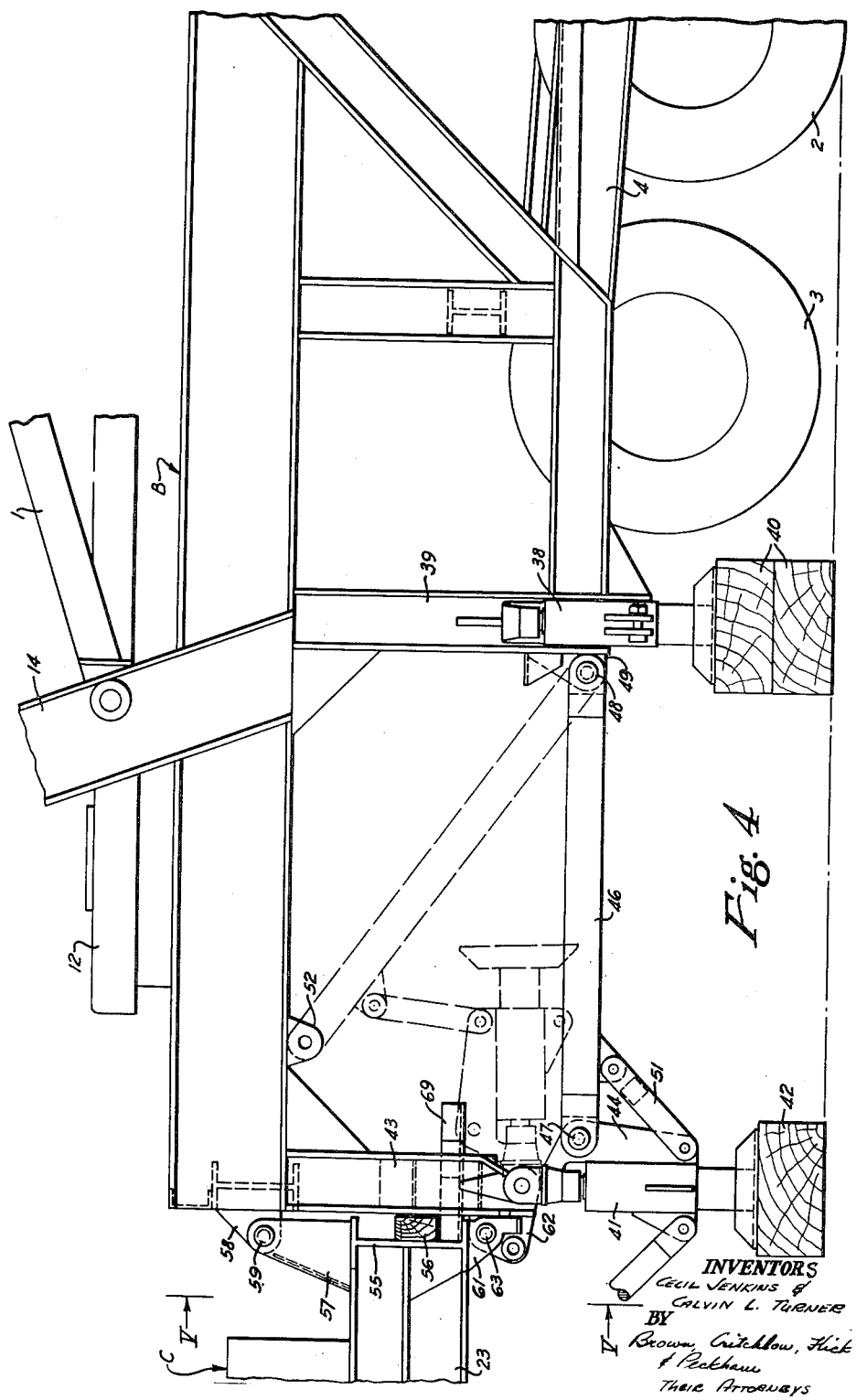

2,787,342

TRAILER MOUNTED DRILLING RIGS

Cecil Jenkins and Calvin L. Turner, Tulsa, Okla., assignors to Lee C. Moore Corporation, Pittsburgh, Pa., a corporation of Pennsylvania Application January 7, 1954, Serial No. 402,801

9 Claims. (Cl. 189—11)

This invention relates to oil well drilling apparatus, and more particularly to trailer-mounted equipment.

Oil well drilling masts frequently are permanently mounted on truck trailers so that they can be quickly transported to another location after being swung down to a reclining position. The general practice also has been to mount the drawworks and engines, as well as the gin pole for raising the mast, all on the same trailer. This is a great convenience, but the combined weight of all this equipment is so great that the capacity of the mast is restricted. When it is desired to use a larger mast, the arrangement just described cannot be employed without exceeding trailer capacity or highway load limitations. It has therefore been proposed to divide up the load between two trailers, the mast and gin pole being mounted on one trailer and the drawworks and engines on the other. This permits the use of larger and heavier equipment than before, but it presents the difficulty of aligning and connecting the two trailers at the drilling location in such a way that the engines and drawworks can be operatively connected with the mast and rotary table in correct relationship.

It is among the objects of this invention to provide a two trailer oil drilling rig, in which the trailers can quickly and easily be coupled together in predetermined relative positions, in which the mast-carrying trailer also forms the catwalk, in which the mast trailer is tilted during transportation, and in which leveling of the mast trailer from transportation to operating position helps to connect the two trailers together.

The preferred embodiment of the invention is illustrated in the accompanying drawings, in which Fig. 1 is a side view of our two trailer rig as the mast trailer is being backed up against the rear end of the drawworks trailer;

Fig. 2 is a similar view after the mast trailer truck has been driven away and the two trailers have been connected and the gin pole raised;

Fig. 3 is a plan view of the apparatus shown in the preceding figure;

Fig. 4 is an enlarged fragmentary side view of the connected rear ends of the two trailers;

Fig. 5 is a vertical section through the drawworks trailers taken on the line V—V of Fig. 4;

Figs. 6 and 7 are fragmentary horizontal sections taken on the lines VI—VI and VII—VII, respectively, of Fig. 5; and Fig. 8 is a fragmentary vertical section taken on the line VIII—VIII of Fig. 5, but with the trailers in the positions they occupy in Fig. 1.

Referring to Fig. 1 of the drawings, a semi-trailer A, for carrying a reclining mast 1 and supporting it in upright position while a well is being drilled, has a set of tandem wheels 2 and 3 supporting a suitable horizontal frame 4. Rigidly connected to the front of this frame and extending forward from it is a long, straight tongue 6. The bottom of the front end of the tongue is provided with a king pin 7 (Fig. 2) that is detachably connected to the fifth wheel 8 of a tractor or truck 9 (Fig. 1) that hauls the trailer. The trailer tongue is inclined, with its front end considerably higher than its rear end, for a purpose that will be described presently. The frame 4 supports an oil well mast substructure B that extends several feet above the level of the tongue, where it is covered by a working platform 10 lying in a plane inclined to substantially the same degree as the tongue. The opposite sides of the platform may be provided with hinged or removable floor extensions 11 (Fig. 3) in a well-known manner when the rig is in operating position. The substructure extends several feet behind the wheels in order to support a rotary table 12 behind them.

Projecting upward from opposite sides of the substructure near the front of the rotary table are two supports 14, to the lower portions of which the front legs of oil well mast 1 are hinged. The mast, in its prone position, extends forward over the trailer tongue and the cab of the truck and is supported by a rack 16 detachably mounted on the front end of the tongue. The mast may be of any desired construction, the one shown being the type that has an open front or lower face, and it is formed in two parts telescoped together during transportation. Pivotally connected to the upper ends of supports 14 are the feet of the two front or lower legs 17 of a reclining gin pole which includes upper or rear legs 18 folded down upon the lower legs.

One of the features of this invention is that the tongue 6 is long and wide enough to support a catwalk 20, from which drill pipes are skidded up a ramp 21 (Fig. 3) onto the working platform. A stairway 22 extends from the platform down beside the ramp to a point a little more than one step from the ground. The rear end of the catwalk is located at approximately catwalk height, which generally is about three and a half feet, but the front end of the inclined catwalk above the fifth wheel may be five feet or more from the ground.

Also shown in Fig. 1, directly behind trailer A, is a drawworks semi-trailer C which has a substantially horizontal bed 23 supported at its rear end by a set of wheels 24. The opposite end of the bed is provided with a depending king pin 25 for connection to the fifth wheel of a truck that is not shown in the drawings. The bed in front of the wheels is supported by screw jacks 26. Permanently mounted on the back part of the trailer is a drawworks unit 27 that is operated by a pair of engines 28 in front of it. Floor extensions 29 (Fig. 3) may be added if desired.

When the mast trailer A is backed into final position, a jack 31 that is suspended from the front portion of the tongue is extended so that it will engage the ground and take the weight of the front end of the trailer to allow the truck to be uncoupled and driven away. The jack preferably is one that is operated by a line 32 from the customary winch 33 carried by the truck. After the truck has moved forward, the jack is lowered to lower the inclined tongue and catwalk into substantially horizontal position, as shown in Fig. 2. This causes the trailer to fulcrum on its front wheels 2 and to tilt the substructure and working platform into level positions. As the front end of the tongue is lowered, the rear wheels 3 are lifted from the ground. When desired, the length of the horizontal catwalk can be increased by setting a separate catwalk section 34 at its front end. The rear end of the tongue carries a pair of jacks 36 that are lowered onto a stringer 37 (Fig. 2) resting on the ground and then extended to help take the weight off the front wheels. Similar jacks 38 are connected to the lower ends of vertical columns 39 of the substructure behind the wheels, for supporting the central portion of the substructure on stringers 40.

The weight of the rear end of the substructure is taken by a pair of jacks 41 that likewise rest on a wooden stringer 42. Since these rear jacks would be located too close to the ground when the front end of the tongue is raised to traveling position, provision is made for swinging the jacks upward when they are not in use. Accordingly, as shown in Fig. 4, the upper end of each jack is pivotally connected to the lower end of a vertical column 43 of the substructure. Projecting forward from the jack is a vertical plate 44, the upper end of which is straddled by the forked rear end of a horizontal brace 46. The brace is detachably connected to the plate by means of a removable pin 47. The front end of the brace is pivotally connected by a pin 48 to a bracket 49 on middle column 39 of the substructure. The jack is further braced by a short link 51 which is pivotally connected to the lower end of plate 44 and to the bottom of brace 46 to short distance in front of the plate. When the mast trailer is prepared for travel, the pin 47 is removed from the rear end of the horizontal brace and then that end is swung upward and connected by the pin to a bracket 52 near the top of the substructure. This causes the link to swing the jack upward into a more or less horizontal position, as shown in broken lines in Fig. 4.

The rear cross beam 55 of the drawworks trailer bed 23 may have a horizontal wooden beam 56 secured to its rear face to serve as a bumper if the other trailer is backed into it. Mounted on top of beam 55 at longitudinally spaced intervals are brackets 57, each of which is formed from a pair of plates that diverge downwardly and have spaced parallel upper ends provided with aligned holes. Each of these brackets is designed to receive a lug 58 projecting from the back of the upper part of the substructure on the mast trailer. The lugs are provided with holes for alignment with the holes in the brackets, so that pins 59 can be inserted in them to connect the lugs and brackets together. Projecting downward from each end of cross beam 55 is a bifurcated bracket 61 having spaced parallel upper portions and downwardly diverging lower portions. Each of these brackets is intended to receive a lug 62 projecting from the back of the rear column of the substructure. The lug is provided with a hole for alignment with the bracket holes, and a pin 63 is inserted in them to connect the lug and bracket together.

As shown in Figs. 5, 7 and 8, the lower flange of cross beam 55 is provided with a pair of longitudinally spaced openings and the web of the beam is notched above them, so that a sleeve 65 can be welded in each opening. These sleeves receive upwardly tapered dowel pins 66 that have their lower ends rigidly mounted on brackets 67 projecting from the back of the substructure.

After the drawworks trailer has been located in the desired position, the mast trailer is backed up in as straight a line as possible toward the rear end of the first trailer. The mast trailer is manipulated until the rear corner columns 43 of the substructure straddle two guiding horns 69 that project rearwardly from the rear cross beam 55 of the drawworks trailer. As shown in Fig. 7, these horns have their outer portions inclined inward toward each other, so that the horn that is engaged first by one of the substructure columns 43 will push the substructure laterally as the mast trailer moves back. This causes the mast trailer to be skidded sideways into better alignment with the other trailer, so that lugs 58 will be sure to enter the lower portions of brackets 57 as the mast trailer continues to move backward from the position shown in Figs. 1 and 8. At the same time, the dowel pins 66 move beneath the rear cross beam 55 of the drawworks trailer.

As soon as the two trailers come together, the truck 9 can be removed from mast trailer A and the tongue 6 lowered to horizontal position, as explained previously herein. When the front end of the tongue moves down, the mast trailer pivots on its front wheels 2, so the rear end of the trailer rises. Upward movement of lugs 58 and 62 inside of the upwardly tapered brackets 57 and 61 forces the substructure to move sideways in one direction or the other, if the two trailers are not already in perfect alignment, until the lugs move up between the parallel upper walls of the brackets. As the lugs reach those parallel walls, dowel pins 66 start to move up into sleeves 65. By the time brackets 67 engage the bottom of beam 55, as shown in Figs. 4 and 5, the holes in the lugs are in alignment with the holes in the adjoining brackets. Pins 59 and 63 then can be driven into the brackets and lugs to lock them together. The result is that the rear ends of the two trailers not only are securely coupled together, but they are held in predetermined alignment with each other so that the rear legs 18 of the gin pole can be swung back into elevated shoes 71 mounted on drawworks trailer C. Also, the rotary table 12 on one trailer then is in the correct position to be driven by the drawworks 27 on the other trailer.

As soon as the two trailers have been fastened together, mast trailer jacks 36, 38 and 41 are lowered in order to take the weight off wheels 2 and to provide a firm support for the substructure B. The jacks also can be used to help the mast trailer move into coupling relation with the other trailer where the ground is uneven, and of course the jacks are employed for leveling the substructure when that is necessary. The two trailers, securely fastened together, serve as a unitary support for the drawworks, engines, rotary table, gin pole and mast. The mast then can be raised in the usual manner by the drilling line 72 connected to the drawworks and to the traveling block 73, which in turn is connected to a sling 74 that may extend around two sets of sheaves 76 and 77 in the mast before passing around a pair of sheaves 78 at the top of the gin pole and then back to the mast. The catwalk 20, being part of the mast trailer, is put in position at the same time as the substructure and does not require a separate operation for that purpose. It supports the traveling block during transportation.

After a well has been completed and it is desired to move the trailers to another location, the procedure just outlined is reversed, so that the trailers can be separated and towed away.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A two trailer well drilling rig, comprising a set of mast trailer wheels, a substantially horizontal tongue connected with said wheels and extending forward therefrom a considerable distance, means on the front end of the tongue adapted to be detachably connected to the fifth wheel of a truck, the horizontal tongue being lower than fifth wheel height, an oil well mast substructure supported above and projecting behind the trailer wheels and having a substantially horizontal working platform, a catwalk extending along said tongue, means on the substructure adapted to support a drilling mast, a set of drawworks trailer wheels behind said substructure, a trailer bed supported by the drawworks trailer wheels and projecting backward from them toward said substructure, said bed also extending forward from the wheels and adapted to carry drawworks, interconnected means secured to the adjoining rear ends of said substructure and bed connecting them together in predetermined positions and including vertical pins secured to the substructure and extending from it up through holes in said bed, and means for raising the front end of said tongue to fifth wheel receiving height, whereby the rear end of the substructure will be tilted downward to remove said pins from said holes so that the trailers can be separated.

2. A rig as defined in claim 1, including pairs of downwardly diverging plates carried by the rear end of said bed and provided with holes through their upper ends, projections on the back of said substructure between said diverging plates and provided with holes aligned with the plate holes and removable fasteners extending through the aligned holes to connect the projections and plates together.

3. An oil well drilling semi-trailer for use with a truck having a fifth wheel, comprising trailer wheels resting on the ground, an inclined straight tongue connected with the trailer wheels and extending forward therefrom a considerable distance, the rear end of the tongue being lower than fifth wheel height, means supporting the front end of the tongue high enough to receive a fifth wheel beneath it, means on the front end of the tongue for detachable connection to a fifth wheel, an oil well mast substructure supported above and projecting behind the trailer wheels and having an inclined working platform substantially parallel to the tongue, a catwalk extending up along the inclined tongue, said tongue supporting means being formed for lowering the front end of the tongue until the catwalk and platform are substantially horizontal, trailer-connecting means carried by the rear end of said substructure and operable by its upward movement for fastening the substructure to a drawworks-carrying trailer, and means on the substructure adapted to pivotally support the rear end of a reclining oil well drilling mast extending forward above the catwalk so that the mast can be swung up to upright position above the leveled platform.

4. A trailer as defined in claim 3, including jacks hinged to the bottom of the rear end of said substructure, a brace for each jack having one end pivoted to the substructure in front of the jack and having its opposite end detachably connected to the substructure above the jack, a link pivotally connected to the brace and jack and holding the latter in a generally horizontal position, and means for connecting the adjacent end of the brace to the upper part of the jack after that end of the brace has been disconnected from the substructure and swung down to permit the jack to swing down to upright position, whereby the jacks can be extended to support the rear end of the substructure.

5. A trailer as defined in claim 3, including a rotary table mounted on said substructure close to its rear end.

6. A trailer as defined in claim 3, including means projecting from the back of the substructure adapted to be positioned under one end of a drawworks support for lifting it slightly when said substructure is tilted into horizontal position, whereby said trailer will take some of the weight of the drawworks support.

7. An oil well drilling semi-trailer for use with a truck having a fifth wheel, comprising a tandem wheel assembly resting on the ground, a horizontal frame supported by said assembly, an inclined tongue connected to the front of said frame and extending forward therefrom a considerable distance, the rear end of the tongue being lower than fifth wheel height, means supporting the front end of the tongue high enough to receive a fifth wheel beneath it, means on the front end of the tongue for detachable connection to a fifth wheel, an oil well mast substructure supported by said frame and projecting behind said wheels, the substructure having an inclined working platform above the level of said tongue substantially parallel to the tongue, a ramp extending from the front end of the platform down to the tongue near the trailer wheels, a catwalk extending up along the inclined tongue from the ramp, a reclining oil well drilling mast extending from above said platform forward above the catwalk and having an open lower side, said tongue-supporting means being formed for lowering the front end of the tongue to rock the trailer on the front wheels of said tandem assembly until the catwalk and platform are substantially horizontal and the rear end of said frame is tilted upward, and means hinging the mast to said substructure so that the mast can be swung up to upright position above the leveled platform.

8. A two trailer well drilling rig, comprising a set of mast trailer wheels, a tongue connected with said wheels and extending forward therefrom, means on the front end of the tongue adapted to be detachably connected to the fifth wheel of a truck but being lower than fifth wheel height, an oil well mast substructure supported above and projecting behind the trailer wheels and having a substantially horizontal working platform, means on the substructure adapted to support a drilling mast, a set of drawworks trailer wheels behind said substructure, a trailer bed supported by the drawworks trailer wheels and projecting backward from them toward said substructure, said bed also extending forward from the wheels and adapted to carry drawworks, means secured to said substructure and projecting rearwardly therefrom beneath the rear end of said bed in engagement with a lower surface thereof, vertically separable connecting means connecting said rearwardly projecting means and bed together in predetermined positions, said connecting means being separable by downward movement of the rear end of the substructure, and means for raising the front end of said tongue to fifth wheel receiving height, whereby the rear end of the substructure will be tilted downward to separate said connecting means so that the trailers can be separated.

9. A two trailer well drilling rig, comprising a set of mast trailer wheels, a tongue connected with said wheels and extending forward therefrom, means on the front end of the tongue adapted to be detachably connected to the fifth wheel of a truck but being lower than fifth wheel height, an oil well mast substructure supported above and projecting behind the trailer wheels and having a substantially horizontal working platform, means on the substructure adapted to support a drilling mast, a set of drawworks trailer wheels behind said substructure, a trailer bed supported by the drawworks trailer wheels and projecting backward from them toward said substructure, said bed also extending forward from the wheels and adapted to carry drawworks, interconnected means secured to the adjoining rear ends of said substructure and bed connecting them together in predetermined positions and including vertical pins secured to the substructure and extending from it up through holes in said bed, and means for raising the front end of said tongue to fifth wheel receiving height, whereby the rear end of the substructure will be tilted downward to remove said pins from said holes so that the trailers can be separated.

References Cited in the file of this patent

UNITED STATES PATENTS

| | | |
|---|---|---|
| 1,697,940 | Turney | Jan. 8, 1929 |
| 2,229,653 | Hohl | Jan. 28, 1941 |
| 2,271,578 | Woolslayer et al. | Feb. 3, 1942 |
| 2,300,763 | Athy | Nov. 3, 1942 |
| 2,335,584 | Couse | Nov. 30, 1943 |
| 2,360,654 | Day | Oct. 17, 1944 |
| 2,403,080 | Hilborn | July 2, 1946 |
| 2,551,286 | Poetker | May 1, 1951 |
| 2,617,500 | Cardwell et al. | Nov. 11, 1952 |
| 2,663,375 | Caldwell | Dec. 22, 1953 |